US006851877B1

(12) United States Patent
Liebhold

(10) Patent No.: US 6,851,877 B1
(45) Date of Patent: Feb. 8, 2005

(54) KEYBOARD LAYOUT AND METHOD FOR DATA ENTRY

(75) Inventor: Valerie Sacrez Liebhold, Carmel, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 212 days.

(21) Appl. No.: 10/049,392

(22) PCT Filed: Aug. 18, 2000

(86) PCT No.: PCT/US00/22655

§ 371 (c)(1),
(2), (4) Date: Feb. 12, 2002

(87) PCT Pub. No.: WO01/13210

PCT Pub. Date: Feb. 22, 2001

Related U.S. Application Data
(60) Provisional application No. 60/149,552, filed on Aug. 18, 1999.

(51) Int. Cl.[7] .................................................. B41J 5/10
(52) U.S. Cl. .................... 400/486; 400/489; 341/22; 345/169
(58) Field of Search ............................. 400/472, 486, 400/489; 341/22; 345/168, 169

(56) References Cited

U.S. PATENT DOCUMENTS

| | | | | |
|---|---|---|---|---|
| 3,970,185 A | * | 7/1976 | Shelton ...................... 400/482 |
| 4,444,520 A | | 4/1984 | Hanakata et al. .............. 400/88 |
| 5,203,635 A | * | 4/1993 | Freedman .................... 400/91 |
| 5,402,481 A | * | 3/1995 | Waldman ............... 379/355.01 |
| 5,487,616 A | * | 1/1996 | Ichbiah ....................... 400/489 |
| 5,584,588 A | * | 12/1996 | Harbaugh .................. 400/486 |
| 5,864,765 A | * | 1/1999 | Barvesten ................... 455/565 |
| 6,035,180 A | * | 3/2000 | Kubes et al. ............. 455/575.1 |
| 6,037,942 A | * | 3/2000 | Millington .................. 345/835 |
| 6,053,647 A | * | 4/2000 | Parkinson ................... 400/486 |
| 6,098,086 A | * | 8/2000 | Krueger et al. ............. 715/535 |
| 6,278,497 B1 | * | 8/2001 | Sumiyoshi et al. ......... 348/722 |
| 6,507,336 B1 | * | 1/2003 | Lunsford .................... 345/168 |
| 6,512,525 B1 | * | 1/2003 | Capps et al. ................ 345/762 |
| 6,574,551 B1 | * | 6/2003 | Maxwell et al. ............. 701/209 |
| 6,593,914 B1 | * | 7/2003 | Nuovo et al. ............... 345/169 |

FOREIGN PATENT DOCUMENTS

| | | | |
|---|---|---|---|
| DE | 345365 | 12/1921 | |
| EP | 0858023 | 8/1998 | ........... G06F/3/023 |
| FR | 924048 | 7/1947 | ........................ 5/3 |
| WO | 99/46563 | 9/1999 | ........... G01C/21/20 |

OTHER PUBLICATIONS

PCT Search Report listing the above documents.

* cited by examiner

*Primary Examiner*—Andrew H. Hirshfeld
*Assistant Examiner*—Dave A. Ghatt
(74) *Attorney, Agent, or Firm*—Joseph S. Tripoli; Joseph J. Laks; Reitseng Lin

(57) ABSTRACT

A keyboard layout and a method of data entry utilizing the keyboard layout is provided. In one form, the present invention is a data entry device having a plurality of user selectable keys wherein the keys are arranged about a central point or key such that each key is at a minimum distance from the central point or key relative to each other key. Each key represents a character and/or symbol. In the case of an alphabet, the keys representing the characters of the alphabet may be arranged alphabetically. In another form, the present Invention provides a system and method for data entry wherein the distance between input keys or choices of an input device are minimized by providing a central reference point wherein a selection medium returns to the reference point after each input/key selection.

20 Claims, 5 Drawing Sheets

KEYBOARD LAYOUT AND METHOD FOR DATA ENTRY

This application claims the benefit under 35 U.S.C. § 365 of International Application PCT/US00/22655, filed Aug. 18, 2000, which was published in accordance with PCT Article 21(2) on Feb. 22, 2001 in English; and which claims benefit of U.S. provisional application Ser. No. 60/149,552 filed on Aug. 18, 1999.

FIELD OF THE INVENTION

The present invention relates to data entry and, more particularly, to a keyboard and an associated system and method of data entry.

BACKGROUND OF THE INVENTION

Many electronic devices require input from a user. In some instances, such input is in the form of simple yes/no or on/off functions that may be accomplished via switches and/or buttons. In other instances, such input may be more complex requiring the use of an input device having various alpha-numeric characters and/or other symbols.

In the latter case, a physical keyboard is typically utilized as the input device in order to allow the user the ability to input data in various forms. Keyboards, or a form thereof, are utilized for data entry in a myriad of devices, including computers, ATMs, kiosks, toys, and the like.

In addition to physical keyboards as data entry devices, a display may depict a data entry screen. The data entry screen may depict choices in a menu structure or may provide alpha-numeric keys. That is, the data entry screen may be a visual representation of a keyboard (i.e., a virtual keyboard). Data entry may be accomplished via a touch-screen in conjunction with the display or via a movable cursor or highlighter. Other means of data entry may be used as well. Thus, the term "keyboard" as used In all of the above cases, the data inputted is processed or used by the device in one manner or another. In one case, the input of data may allow for personalization of a consumer electronics product, such as through applications associated with the consumer electronic product. As with any data entry system, the ease and rapidity of data entry is of great importance.

One drawback with all of the above data entry systems or devices, is the time it takes to navigate from one character/symbol or key to another. This is especially true of input devices that utilize a cursor, highlighted device and/or the like typically in conjunction with an on-screen display. When the cursor is placed on a key, it may take time for the cursor to move from the chosen key to the next key. With non-alphabetical keyboards, extensive training may be required to remember where each key is located.

It has been recognized by the present inventor, however, that if the distance between keys of the data input device can be minimized, the time spent to perform data entry can be reduced

SUMMARY OF THE INVENTION

In one form, the present invention is a data entry device having a plurality of user selectable keys wherein the keys are arranged about a central point or key such that each key is at a minimum distance from the central point or key relative to each other key. Each key represents a character and/or symbol. In the case of an alphabet, the keys representing the characters of the alphabet may be arranged alphabetically.

In another form, the present invention provides a system and method for data entry wherein the distance between input keys or choices of an input device are minimized by providing a central reference point wherein a selection medium returns to the reference point after each input/key selection.

BRIEF DESCRIPTION OF THE DRAWINGS

Reference to the following description of the present invention should be taken in conjunction with the accompanying drawings, wherein.

Corresponding reference characters indicate corresponding parts throughout the several views.

DETAILED DESCRIPTION OF THE INVENTION

Figure 1:
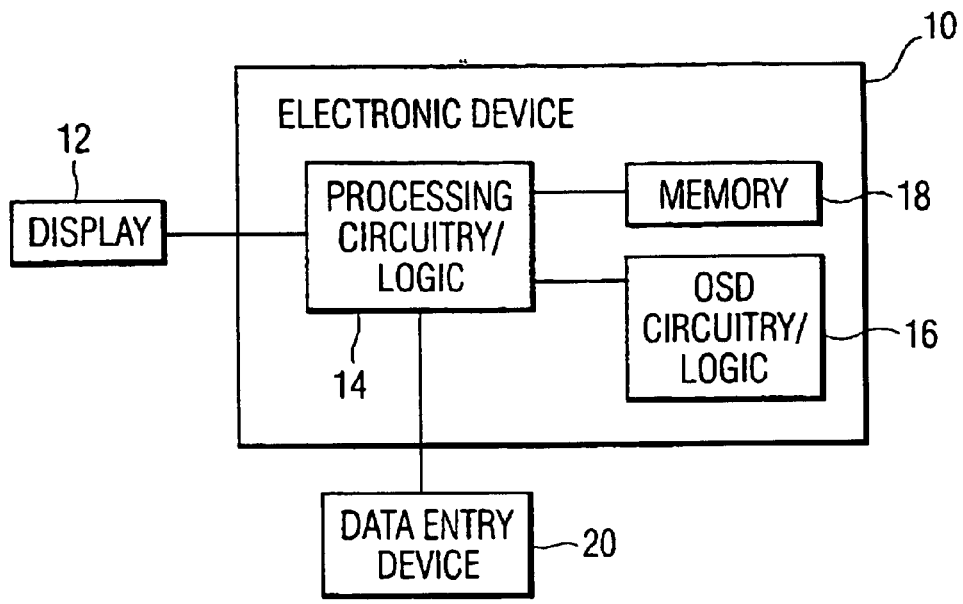
FIG. 1 is a diagrammatic representation of an exemplary electronic device operable to utilize the present data entry configuration and method of data entry in accordance with the principles of the present invention.

With reference to FIG. 1, there is shown a block representation of a generic electronic device, generally designated 10, that may be used to carry out the principles of the present invention. The electronic device 10 is typically used in conjunction with a display 12 that may be integral with the electronic device 10 or may be external to the electronic device 10 and in communication therewith. It should be initially appreciated that the electronic device 10 is representative of any type of electronic device and particularly a consumer electronic device, such as a television, a DVD unit, a VHS unit, and/or the like.

The electronic device 10 includes processing circuitry/logic, generally designated 14, on-screen display (OSD) circuitry/logic, generally designated 16, and memory 18. A data entry device 20 is also provided that may or may not be integral with the electronic device 10. The data entry device 20 may include a portion external to the electronic device 10 such as a remote or keyboard with the electronic device 10 having an internal module or interface. As an example, with a remote as a data entry device, the remote may have buttons or keys that allow for movement of a cursor, highlighter, or the like on the display 12 with signals generated by and emanating from the remote in response to the selection of keys by the user received by a complementary sensor or receiver in the electronic device 10. In the case of a keyboard as the data entry device 20, the electronic device 10 would have an interface for receiving a plug or connector for the keyboard and an appropriate interface for interpreting the signals generated by the keyboard in response to the selection of keys by the user. In accordance with one aspect of the present invention, the data entry device controls selection of keys shown on the display 12. Other components and/or circuitry typically forming a part of the electronic device 10 and/or particular to the type of electronic device are not shown.

It should be appreciated that the connections shown between the various components of the electronic device 10 are only exemplary, as is the separation or discrete depiction of the various components. The separation of components is only for illustration.

The memory 17 is operable to store instructions that are executable by the processing circuitry/logic unit 14. The instructions allow the electronic device 10 to function appropriately in accordance with known functionality and/or the functionality discussed herein. The OSD unit 16 is operable to provide the display of text, graphics, and/or the like on the display 12 such as a display of a representation of a data entry keyboard. The data entry device 18 is operable to allow user input of data which is used by the electronic device 10.

In one form, the data entry device 18 may be a keyboard having a plurality of keys or buttons each representing an alpha-numeric character and/or symbol or providing a function such as cursor control on a display, or a function in conjunction with the operation of the electronic device 10. Hereinafter, the term character includes alpha-numeric characters, symbols, and the like. In another form, the data entry device 18 may include a graphic representation of keyboard that is displayed on the display 12. The graphic keyboard may include a plurality of selectable keys of characters. The graphic or displayed keys may be selectable via a touch-screen, a movable cursor controlled by a remote or other device, or a movable highlight area controlled by a remote or other device.

It should be understood that the term keyboard includes physical or hardware keyboards, as both a stand-alone device or as integrated into an electronic device, and an on-screen display of a keyboard. Further, the term keyboard includes any data entry device having a plurality of keys, buttons and/or the like that may be selected or chosen through user interaction either physically (e.g. a touch-screen) or via an electronic medium (e.g. a controllable cursor or highlighter).

Figure 2:
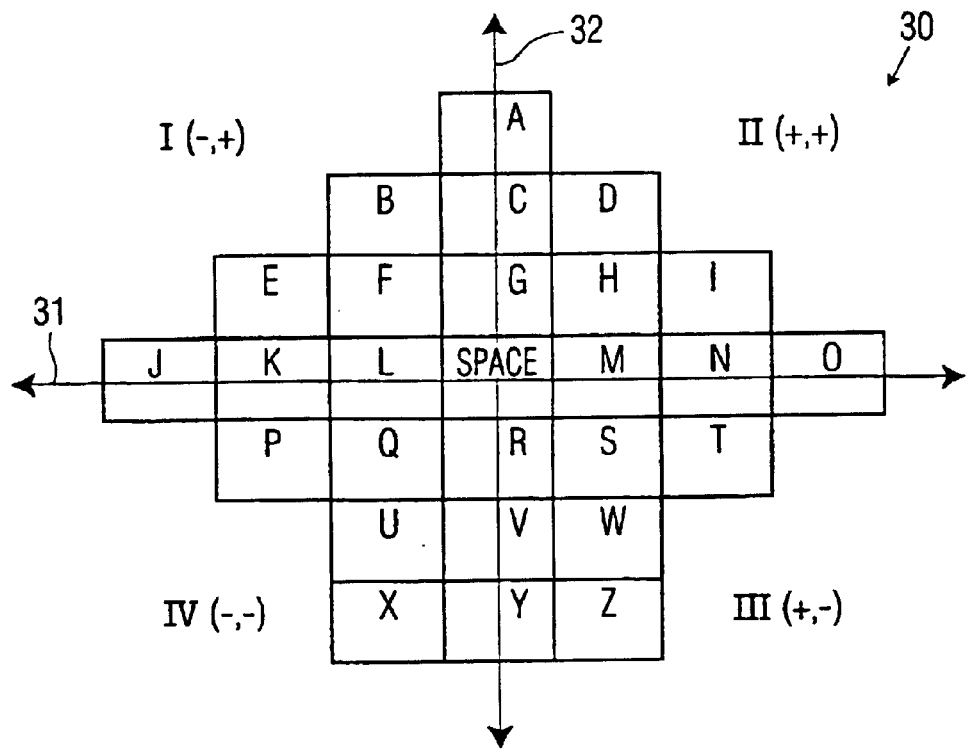
FIG. 2 is a representation of an embodiment of a data entry configuration in accordance with the principles of the present invention.

In FIG. 2, there is depicted one embodiment of a keyboard (i.e. a data entry device) configuration in accordance with the principles of the present invention generally designated 30. The keyboard configuration (hereinafter "configuration") 30 may be termed a "Basic English Roman Alphabet" configuration. Each key is labeled with a corresponding character of the basic English Roman alphabet and functions to allow the entering or inputting of that particular character into the electronic device 10 when selected. The keys are also arranged in alphabetical order. One key or button, here arbitrarily labeled SPACE, is centrally located amidst the remaining plurality of keys. It should be appreciated that any particular key may be the centrally located key. It is, however, appropriate to have a "neutral" key like the SPACE key be the central key.

The plurality of keys are arranged with regard to the central key. The configuration 30 is arranged such that the central key is an origin of an X-Y axis or coordinate system. Particularly, the configuration 30 is arranged to have a major X (horizontal) axis 31 and a major Y (vertical) axis 32. The configuration 30 may thus be broken down into the X-Y coordinate system with each key thereof represented by an X-Y axis (x, y) coordinate. The x value of the (x, y) coordinate is the abscissa while the y value of the (x, y) coordinate is the ordinate. The first quadrant (I) has coordinate values of (−, +), the second quadrant (II) has coordinate values of (+, +), the third quadrant (III) has coordinate values of (−, +), while the fourth quadrant (IV) has coordinate values of (−, −). The values of the coordinates or keys of the configuration 30 are correlated to distances from the origin or central key.

In the first quadrant, x or the abscissa value or distance from the origin is negative while the y or ordinate value or distance from the origin is positive. In the second quadrant, x or the abscissa value or distance from the origin is positive while the y or ordinate value or distance from the origin is positive. In the third quadrant, x or the abscissa value or distance from the origin is positive while the y or ordinate value or distance from the origin is negative. In the fourth quadrant, x or the abscissa value or distance from the origin is negative, while the y or ordinate value or distance from the origin is negative.

In the configuration 30, the major X axis 31 has the same number of keys on both sides of the central key. The major Y axis 32 also has the same number of keys on both sides of the central key. The configuration 30 is also such that the total number of keys of the major X axis 31 is the same as the total number of keys of the major Y axis 32.

In particular, the keys along the positive portion of the X axis 31, here the "M", "N", and "O" keys, each have a positive, non-zero, abscissa value or distance relative to the origin but a zero ordinate value or distance relative to the origin; where "M" is (1,0), "N" is (2,0), and "O" is (3,0). These keys are spaced along the positive portion of the X axis 31 to a maximum positive abscissa value or distance relative to the origin (here the "O" key with a maximum positive value or distance of 3, but which depends on the number of such keys from the central key or origin) with the ordinate value or distance relative to the origin always remaining zero. The keys along the positive portion of the Y axis 32, here the "G", "C", and "A" keys, each have a positive, non-zero, ordinate value or distance relative to the origin but a zero abscissa value or distance relative to the origin, where "G" is (0,1), "C" is (0,2), and "A" is (0,3). These keys are spaced along the positive portion of the Y axis 32 to a maximum positive ordinate value or distance relative to the origin (here the "A" key with a maximum positive value or distance of 3, but which depends on the number of such keys from the central key or origin) with the abscissa value always remaining zero.

The keys along the negative portion of the X axis 31, here the "L", "K", and "J" keys, each have a negative, non-zero, abscissa value or distance relative to the origin but a zero ordinate value or distance relative to the origin, where "L" is (−1,0), "K" is (−2,0), and "J" is (−3,0). These keys are spaced along the negative portion of the X axis 31 to a maximum negative abscissa value or distance relative to the origin (where the maximum negative abscissa value or distance relative to the origin is defined as the maximum absolute value or distance relative to the origin of the negative abscissa value or distance relative to the origin), there the "J" key with a maximum negative value or distance of 3, but which depends on the number of such keys relative to the central key or origin) with the ordinate value or distance relative to the origin always remaining zero. The keys along the negative portion of the Y axis 32, here the "R", "V", and "Y" keys, each have a negative, non-zero, ordinate value or distance relative to the origin but a zero abscissa value or distance relative to the origin, where "R" is (0,−1), "V" is (0,−2), and "Y" is (0,−3). These keys are spaced along the negative portion of the Y axis 32 to a maximum negative ordinate value or distance relative to the origin (where the maximum negative ordinate value or distance relative to the origin is defined as the maximum absolute value or distance relative to the origin of the negative ordinate value or distance relative to the origin), (here the "Y" key with a maximum negative value or distance of 3, but which depends on the number of such keys relative to the central key or origin) with the abscissa value or distance relative to the origin always remaining zero.

The keys of configuration 30 not on the X axis 31 or Y axis 32 each have an (x, y) or (abscissa, ordinate) coordinate value or distance relative to the origin both of which are non-zero in all cases. Each one of these keys is in one of the four quadrants (i.e. I, II, III, or IV). For example, in the first quadrant, the "F" key has a coordinate value or distance relative to the origin of (−1,1), the "B" key has a coordinate value or distance relative to the origin of (−1,2), and the "E" key has a coordinate value or distance relative to the origin of (−2,1). In each case with regard to the first quadrant keys, no key has an abscissa value or distance relative to the origin that exceeds the maximum negative abscissa value or distance relative to the origin while at the same time no key has an ordinate value or distance relative to the origin that exceeds the maximum ordinate value or distance relative to the origin.

In the second quadrant, the "H" key has a coordinate value or distance relative to the origin of (1,1), the "D" key has a coordinate value or distance relative to the origin of (1,2), and the "I" key has a coordinate value or distance relative to the origin of (2,1). In each case with regard to the second quadrant keys, no key has an abscissa value or distance relative to the origin that exceed the maximum abscissa value or distance relative to the origin while at the same time no key has an ordinate value or distance relative to the origin that exceed the maximum ordinate value or distance relative to the origin.

In the third quadrant, the "S" key has a coordinate value or distance relative to the origin of (1,−1), the "T" key has a coordinate value or distance relative to the origin of (2,−1), the "W" key has a coordinate value or distance relative to the origin of (1,−2), and the "Z" key has a coordinate value or distance relative to the origin of (1,−3). In each case with regard to the third quadrant keys, no key has an abscissa value or distance relative to the origin that exceeds the maximum abscissa value or distance relative to the origin while at the same time no key has an ordinate value or distance relative to the origin that exceeds the maximum negative ordinate value or distance relative to the origin.

In the fourth quadrant, the "Q" key has a coordinate value or distance relative to the origin of (−1,−1), the "P" key has a coordinate value or distance relative to the origin of (−2,−1), the "U" key has a coordinate value or distance relative to the origin of (−1,−2), and the "X" key has a coordinate value or distance relative to the origin of (−1,−3). In each case with regard to the fourth quadrant keys, no key has an (absolute) abscissa value or distance relative to the origin that exceeds the maximum negative abscissa value or distance relative to the origin while at the same time no key has an (absolute) ordinate value or distance relative to the origin that exceeds the maximum negative ordinate value or distance relative to the origin.

In summation, the configuration 30 provides for a minimum distance for at least a majority of keys of the plurality of keys, relative to the central key particularly when the central key is referenced after selection of a particular key. In addition, the configuration 30 provides for a maximum distance of any key of the arrangement from the origin, or center key, to be no more than the distance from the origin of one of the maximum abscissa value, minimum abscissa value, maximum ordinate value, and minimum ordinate value for coordinates of keys included in the arrangement. Distance from the origin in this regard may be defined as the square root of the sum of the squares of the x and y coordinates for a particular key (i.e., $(x^2+y^2)^{1/2}$). Thus, for example, if activation of a, particular key in a displayed representation of a keyboard is accomplished by moving a cursor to the desired key and then selecting the key, and if each, selection of a key is followed by a return of the cursor to the origin or center key, then each subsequent selection of any key will involve moving the cursor no more than the above-described maximum distance from the origin.

Figure 3:
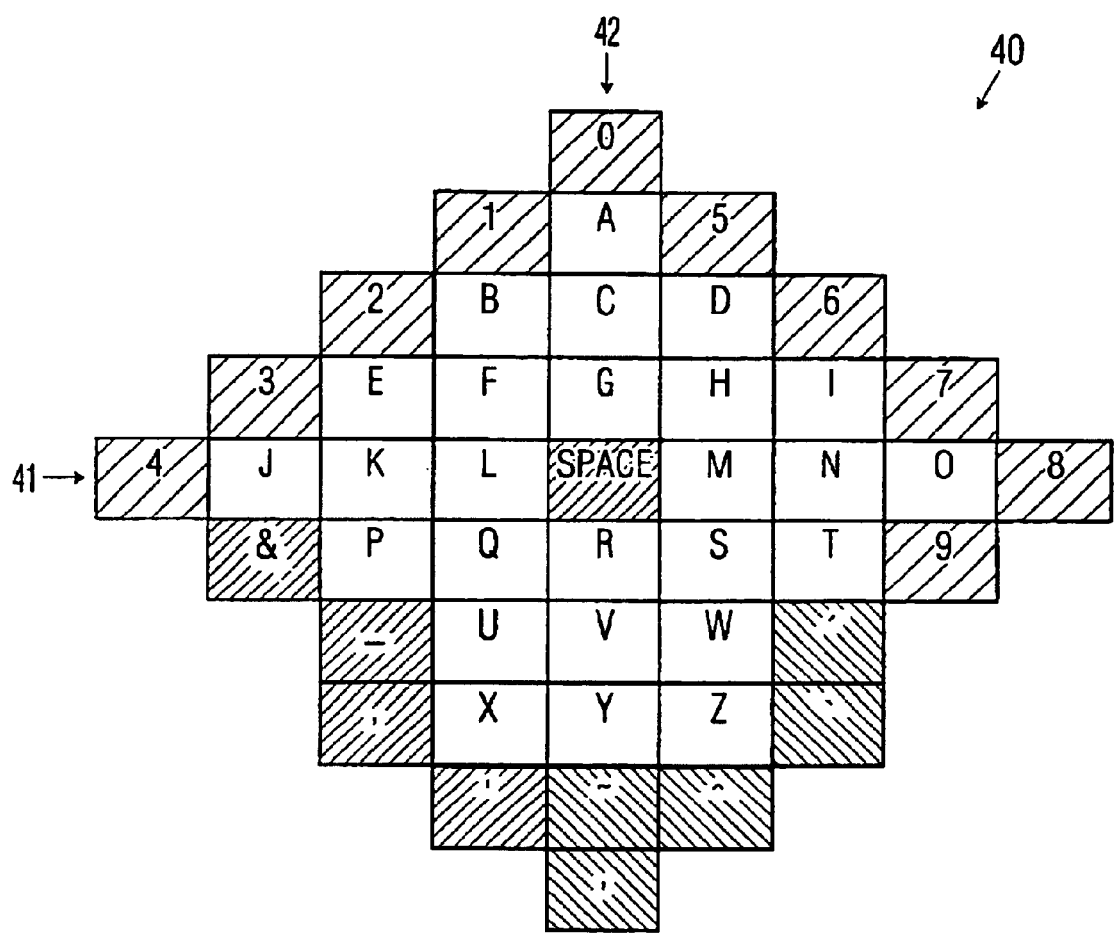
FIG. 3 is a representation of a second embodiment of a data entry configuration in accordance with the principles of the present invention.

In FIG. 3, there is depicted a second embodiment of a keyboard (i.e. a data entry device) configuration in accordance with the principles of the present invention generally designated 40. The keyboard configuration (hereinafter. "configuration") 40 may be termed an "Advanced North American Roman Alphabet" configuration. Each key is labeled with a corresponding character of the North American Roman Alphabet with the addition of numbers and various symbols and functions to allow the entering or inputting of that particular character into the electronic device 10 when selected. The alphabet keys are also arranged in alphabetical order. One key or button, here arbitrarily labeled SPACE, is centrally located amidst the remaining plurality of keys. It should be appreciated that any particular key may be the centrally located key. It is, however, appropriate to have a "neutral" key like the SPACE key be the central key. As well, the same X-Y coordinate system as described above with reference to FIG. 2 is applicable to the configuration 40 of FIG. 3.

In this regard, the configuration 40 includes an X (horizontal) axis 41 and a Y (vertical) axis 42. The various keys also have coordinate values or distances relative to the origin in like manner to that described with reference to FIG. 2. However, with the configuration 40, the maximum positive abscissa value or distance relative to the origin is 4, the maximum negative abscissa value or distance relative to the origin is 4, the maximum positive ordinate value or distance relative to the origin is 4, and the maximum negative ordinate value or distance relative to the origin is 5. Further, with the configuration 40, all coordinates or distances from the origin of all the quadrant keys are less than the various maximum values or distances relative to the origin (positive and negative, ordinate and abscissa).

Figure 4:
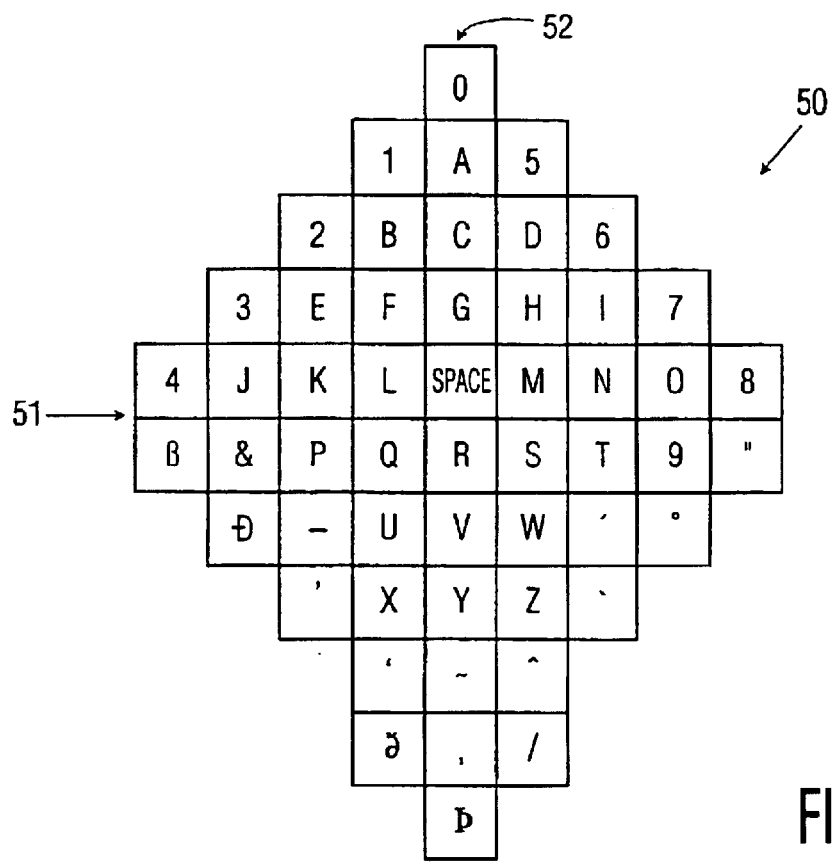
FIG. 4 is a representation of a third embodiment of a data entry configuration in accordance with the principles of the present invention.

In FIG. 4, there is depicted a third embodiment of a keyboard configuration generally designated 50. The keyboard configuration 50 may be termed "Advanced European Roman Alphabet" configuration. Each key is labeled with a corresponding character of the European Roman Alphabet with the addition of numbers and various symbols and functions to allow the entering or inputting of that particular character into the electronic device 10 when selected. The alphabet keys are also arranged in alphabetical order. One key or button, here arbitrarily labeled SPACE, is centrally located amidst the remaining plurality of keys. It should be appreciated that any particular key may be the centrally located key. It is, however, appropriate to have a "neutral" key like the SPACE key be the central key. As well, the same X-Y coordinate system as described above with reference to FIG. 2 is applicable to the configuration 50 of FIG. 4.

In this regard, the configuration 50 includes an X (horizontal) axis 51 and a Y (vertical) axis 52. The various keys also have coordinate values or distances relative to the origin in like manner to that described with reference to FIG. 2. However, with the configuration 50, the maximum positive abscissa value or distance relative to the origin is 4, the maximum negative abscissa value or distance relative to the origin is 4, the maximum positive ordinate value or distance relative to the origin is 4, and the maximum negative ordinate value or distance relative to the origin is 6. Further, with the configuration 50, all coordinates or distances from the origin of all the quadrant keys are equal to or less than (do not exceed) the various maximum values or distances from the origin (positive and negative, ordinate and abscissa).

Figure 5:
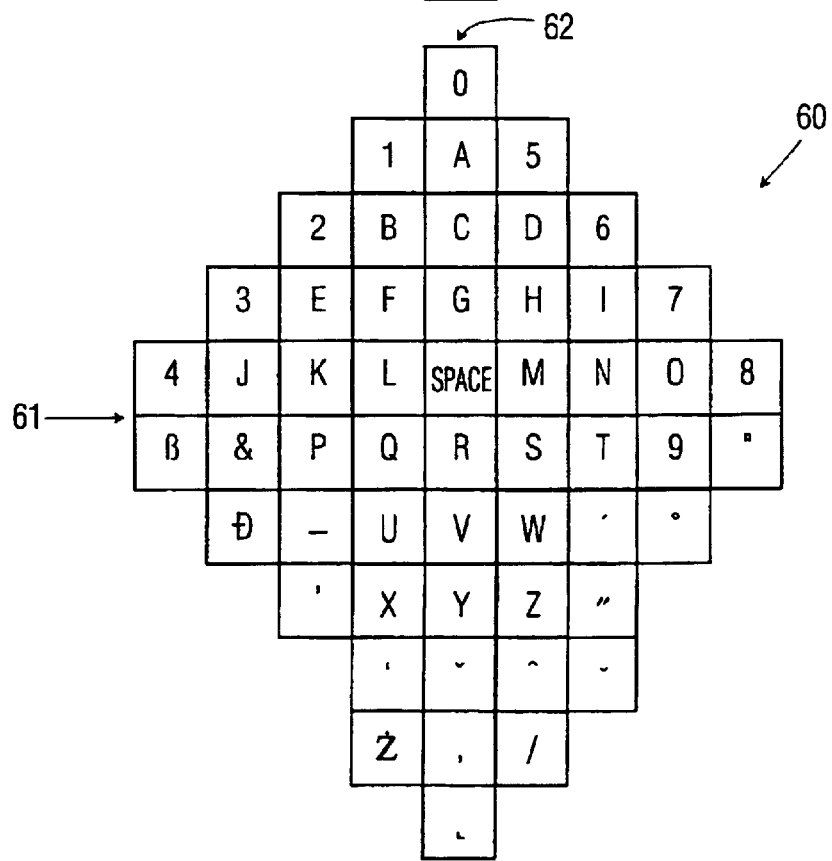
FIG. 5 is a representation of a fourth embodiment of a data entry configuration in accordance with the principles of the present invention.

In FIG. 5, there is depicted a fourth embodiment of a keyboard configuration generally designated 60. The keyboard configuration 60 may be termed "Advanced Central European Roman Alphabet" configuration. Each key is labeled with a corresponding character of the Central European Roman Alphabet with the addition of numbers and various symbols and functions to allow the entering or inputting of that particular character into the electronic device 10 when selected. The alphabet keys are also arranged in alphabetical order. One key or button, here arbitrarily labeled SPACE, is centrally located amidst the remaining plurality of keys. It should be appreciated that any particular key may be the centrally located key. It is, however, appropriate to have a "neutral" key like the SPACE key be the central key. As well, the same X-Y coordinate system as described above with reference to FIG. 2 is applicable to the configuration 60 of FIG. 5.

In this regard, the configuration 60 includes an X (horizontal) axis 61 and a Y (vertical) axis 62. The various keys also have coordinate values or distances relative to the origin in like manner to that described with reference to FIG. 2. However, with the configuration 60, the maximum positive abscissa value or distance relative to the origin is 4, the maximum negative abscissa value or distance relative to the origin is 4, the maximum positive ordinate value or distance relative to the origin is 4, and the maximum negative ordinate value or distance relative to the origin is 6. Further, with the configuration 60, all coordinates or distances from the origin of all quadrant keys are equal to or less than (do not exceed) the various maximum values or distances relative to the origin (positive and negative, ordinate and abscissa).

Figure 6:
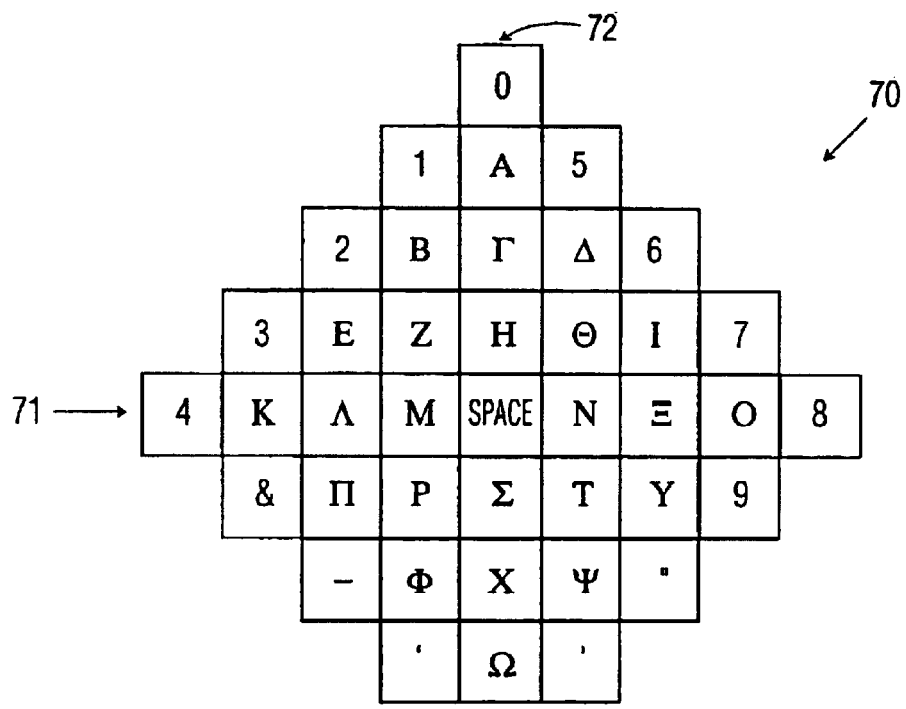
FIG. 6 is a representation of a fifth embodiment of a data entry configuration in accordance with the principles of the present invention.

In FIG. 6, there is depicted a fifth embodiment of a keyboard configuration generally designated 70. The keyboard configuration 70 may be termed "Advanced Greek Alphabet" configuration. Each key is labeled with a corresponding character of the Greek Alphabet with the addition of numbers and various symbols and functions to allow the entering or inputting of that particular character into the electronic device 10 when selected. The alphabet keys are also arranged in alphabetical order. One key or button, here arbitrarily labeled SPACE, is centrally located amidst the remaining plurality of keys. It should be appreciated that any particular key may be the centrally located key. It is, however, appropriate to have a "neutral" key like the SPACE key be the central key. As well, the same X-Y coordinate system as described above with reference to FIG. 2 is applicable to the configuration 70 of FIG. 6.

In this regard, the configuration 70 includes an X (horizontal) axis 71 and a Y (vertical) axis 72. The various keys also have coordinate values or distances relative to the origin in like manner to that described with reference to FIG. 2. However, with the configuration 70, the maximum positive abscissa value or distance relative to the origin is 4, the maximum negative abscissa value or distance relative to the origin is 4, the maximum positive ordinate value or distance relative to the origin is 4, and the maximum negative ordinate value or distance relative to the origin is 3. Further, with the configuration 70, all coordinates or distances from the origin of all the quadrant keys are equal to or less than (do not exceed) the various maximum values or distances relative to the origin (positive and negative, ordinate and abscissa).

Figure 7:
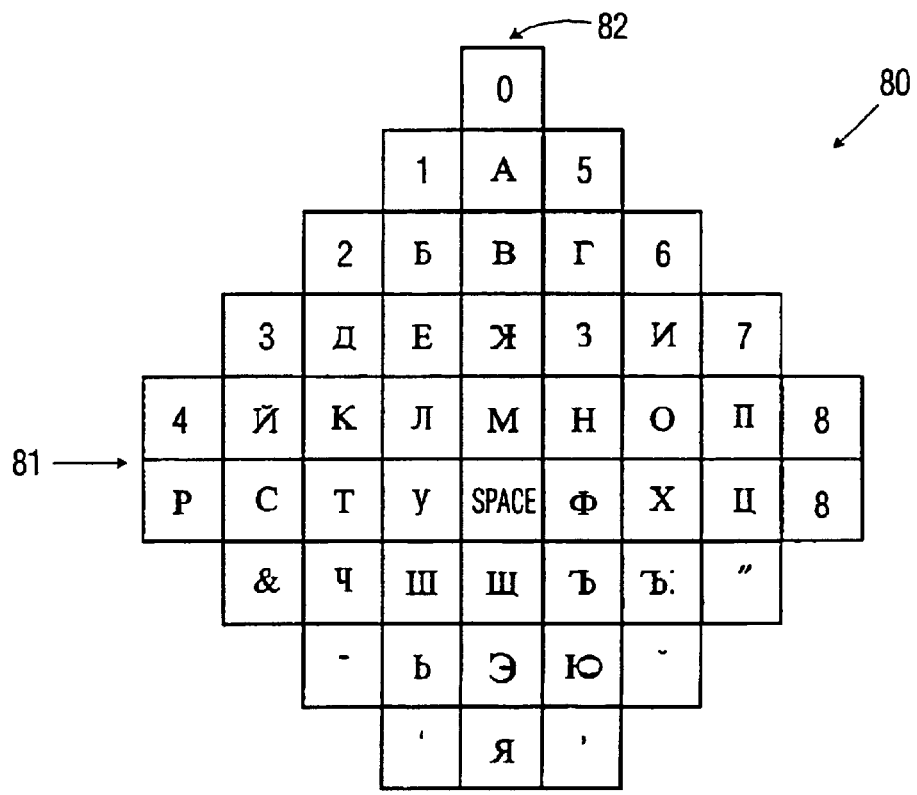
FIG. 7 is a representation of a sixth embodiment of a data entry configuration in accordance with the principles of the present invention.

In FIG. 7, there is depicted a sixth embodiment of a keyboard configuration generally designated 80. The keyboard configuration 80 may be termed "Advanced Cyrillic Alphabet" configuration. Each key is labeled with a corresponding character of the Cyrillic Alphabet with the addition of numbers and symbols and functions to allow the entering or inputting of that particular character into the electronic device 10 when selected. The keys alphabet are also arranged in alphabetical order. One key or button, here arbitrarily labeled SPACE, is centrally located amidst the remaining plurality of keys. It should be appreciated that any particular key may be the centrally located key. It is, however, appropriate to have a "neutral" key like the SPACE key be the central key. As well, the same X-Y coordinate system as described above with reference to FIG. 2 is applicable to the configuration 80 of FIG. 7.

In this regard, the configuration 80 includes an X (horizontal) axis 81 and a Y (vertical) axis 82. The various keys also have coordinate values or distances relative to the origin in like manner to that described with reference to FIG. 2. However, with the configuration 80, the maximum positive abscissa value or distance relative to the origin is 4, the maximum negative abscissa value or distance relative to the origin is 4, the maximum positive ordinate value or distance relative to the origin is 5, and the maximum negative ordinate value or distance relative to the origin is 3. Further, with the configuration 80, all coordinates or distances relative to the origin of all the quadrant keys are equal to or less than (do not exceed) the various maximum values or distances relative to the origin (positive and negative, ordinate and abscissa).

It should be appreciated that the maximum positive and/or negative abscissa values and ordinate values may vary, depending on the particular layout. The configurations of FIGS. 2–7 are thus exemplary of the alphabets that can be utilized and the various configurations for the keyboard.

In accordance with an aspect of the present invention, the centrally located key (i.e. the SPACE key) is a reference key or starting point. When the keyboard configuration is displayed on the display 12, data entry is accomplished by moving a cursor or highlighted area onto a desired key and making the selection. The electronic device 10 is operable to accept data entry from the data entry device. In the case of a physical keyboard, a user's finger presses or selects the appropriate key. In the case of a displayed keyboard, a remote may fit be used to position a cursor or highlighted area on the desired key prior to selection.

Figure 8:
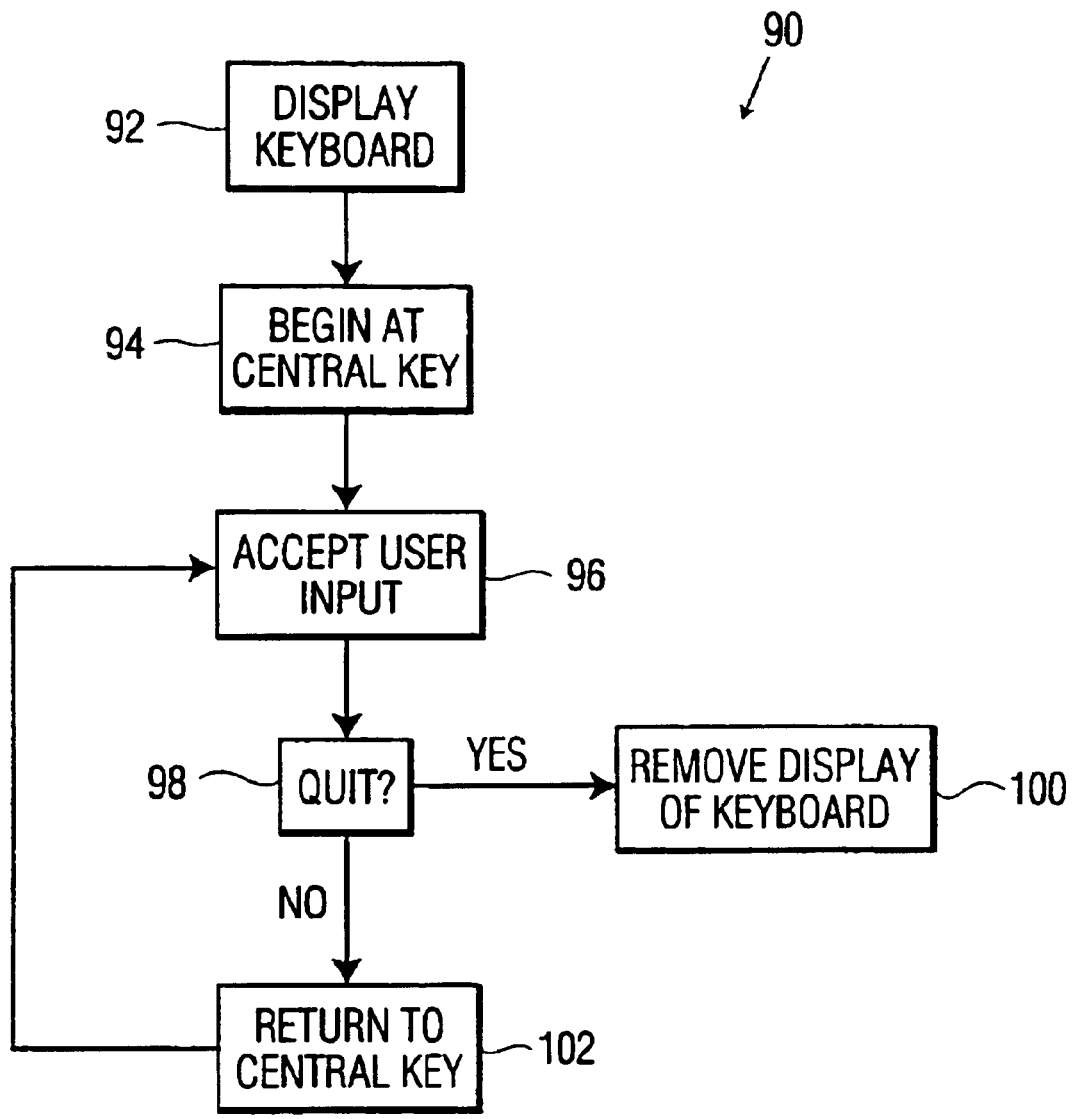
FIG. 8 is a flowchart of a method of data entry in accordance with the principles of the present invention.

Next, a flowchart, generally designated 90, depicted in FIG. 8 is referenced to describe a method of data entry in accordance with the principles presented herein. The instructions for the present method are stored in the memory 18 of the electronic device 10 and executed by the processing circuitry/logic unit 14. It should be appreciated that the flowchart 90 and the method described herein in association with the flowchart 90 is only exemplary of a method to carry out the principles presented herein.

The software routines (i.e. instructions) may be implemented by any means as is known in the art, and in any programming language. Various programming approaches such as procedural, object oriented, or artificial intelligence techniques may be employed.

The steps of the flowchart 90 may be implemented by one or more software routines, processes, subroutines, modules, etc. It should be appreciated that the flowchart 90 is illustrative of merely a broad logical flow of a method in accordance with the principles of the present invention and that steps may be added to, or taken away from, the flowchart 90 without departing from the scope of the present invention. Further, the order of execution of steps in the flowchart 90 may be changed without departing from the scope of the present invention. Additional considerations in implementing the method described by the flowchart 90 in software may dictate changes in the selection and order of steps. Some considerations are event handling by interrupt driven, polled, or other schemes. A multiprocessing or multitasking environment could allow steps to be executed essentially concurrently.

When it is necessary, a keyboard configuration such as one of the configurations shown and described herein is caused to be shown on the display 12, block 92. Once the appropriate configuration is displayed, a cursor is automatically positioned at the central key, block 94. Alternatively to providing the cursor at the central key, the central key is highlighted. The user then begins to enter data by moving the cursor or highlighted area (herein collectively "cursor") to a particular key, block 96. Upon validating the selection by pressing "senter" or a similar key, the electronic device 10 accepts the data input then, sees if the user quits, block 98. If the user selects Quit, display of the keyboard is stopped, block 100, else the cursor is returned to the central key, block 102, to wait for the input of another key, block 96.

Thus, each time a key is selected, the cursor returns to the central key and the user may then navigate to the next key. Since the keys are configured in the manner shown and described herein, no key is substantially any further, requires more keystrokes (in the case of the use of "arrow" keys on a remote) or movement of a mouse or mouselike structure, than any other key.

As an example and with reference to FIG. 3, when the configuration 40 is shown on the display 12, the central key (i.e. SPACE) is highlighted. Assuming a remote is used and includes arrow navigation keys with one keystroke per horizontal or vertical movement, the user proceeds to choose the appropriate key by utilizing the navigation keys to navigate to the desired key (character/symbol). If a name such as "John" is being entered, the user will press the left arrow key three times to land the highlighted area on the "J" and press enter or select. The highlighted area jumps back to the central key (i.e. SPACE). Next, the user presses the right arrow key three times to land the highlight on the "O" key and selects enter. Next, the user presses either an up and right arrow key sequence or a right and up arrow key sequence to place the highlight on the letter "H" and presses enter. The highlighted area then jumps back to the central key (i.e. SPACE). The user then presses the right arrow key twice and selects enter to choose the "N" key that has been highlighted. The highlighted area then jumps back to the central key. The user has made only ten keystrokes (not counting the enter or validation keystrokes).

If the highlight had remained on the letter previously selected such that the user would have to navigate the highlighted area from the previous letter to the next letter, there would have been a total of fourteen keystrokes (not counting the enter or validation keystrokes). The user thus enters only a minimal number of keystrokes to enter the name "John" in accordance with the principles of the present invention.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of data entry comprising:
   (a) depicting a data entry screen on a display, the data entry screen showing a plurality of keys wherein one of said keys is centrally located relative to a remainder of said plurality of keys and a distance from said central located key to any other key of said plurality of keys is defined as a square root of the sum of the squares of an abscissa value and an ordinate value for said any other key;
   (b) making said centrally located key a starting point;
   (c) allowing user selection of any one of said plurality of keys;
   (d) returning to said centrally located key after user selection of any one of said plurality of keys; and
   (e) repeating (c) and (d) until an end of user selection.

2. The method of data entry of claim 1, wherein allowing user selection of any one of said plurality of keys includes navigating to any one of said plurality of keys via a remote.

3. The method of data entry of claim 1, wherein making said centrally located key a starting point includes highlighting said centrally located key.

4. The method of data entry of claim 1, wherein making said centrally located key a starting point includes positioning a cursor on said centrally located key.

5. The method of data entry of claim 1, wherein depicting a data entry screen on a display includes depicting a plurality of keys correlated to an X-Y coordinate system, each of said plurality of keys having a particular coordinate value within the X-Y coordinate system, one of said plurality of keys defining a maximum positive ordinate value, a second one of said plurality of keys defining a maximum negative ordinate value, a third one of said plurality of keys defining a maximum positive abscissa value, and a fourth one of said plurality of keys defining a maximum negative abscissa value, wherein each key of a remainder of said plurality of keys has a coordinate value that is less than or equal to said maximum positive ordinate value, said maximum negative ordinate value, said maximum positive abscissa value, and said maximum negative abscissa value.

6. The method of data entry of claim 5, wherein said plurality of keys form an alphabet.

7. The method of data entry of claim 6, wherein said plurality of keys are arranged in alphabetical order.

8. The method of data entry of claim 5, wherein said plurality of keys form an alpha-numeric data entry system.

9. The method of claim 5, wherein the allowing user selection step includes the step of moving a cursor along two lines respectively parallel to the two axes of the X-Y coordinate system, one line after the other, according to the ordinate and abscissa values of said any one of said plurality of keys.

10. The method of claim 9, wherein the moving step includes moving the cursor along the line parallel to the X axis according to the abscissa value of said any one of said plurality of keys, then moving the cursor along the line parallel to the Y axis according to the ordinate value of said any one of said plurality of keys.

11. The method of claim 1, wherein the abscissa and ordinate values of each of the plurality of keys are integer values.

12. In a consumer electronic device, a method of data entry comprising:

displaying a keyboard on a display, the keyboard showing a plurality of alpha-numeric data entry keys wherein a first key of said plurality of alphanumeric data entry keys is a space key or a reference key located at an origin of an X-Y coordinate system, a second key of said plurality of alpha-numeric data entry keys defining a maximum positive ordinate value, a third key of said plurality of alpha-numeric data entry keys defining a maximum negative ordinate value, a fourth key of said plurality of alpha-numeric data entry keys defining a maximum positive abscissa value, a fifth key of said plurality of keys defining a maximum negative abscissa value, a plurality of first quadrant keys of said plurality of alpha-numeric data entry keys arranged to have absolute values of first quadrant abscissa and ordinate smaller than absolute values of the maximum negative abscissa value and the maximum positive ordinate value, a plurality of second quadrant keys of said plurality of alpha-numeric data entry keys arranged to have absolute values of second quadrant abscissa and ordinate smaller than absolute values of the maximum positive abscissa value and the maximum positive ordinate value, a plurality of third quadrant keys of said plurality of alpha-numeric data entry keys arranged to have absolute values of third quadrant abscissa and ordinate smaller than absolute values of the maximum positive abscissa value and the maximum negative ordinate value and a plurality of fourth quadrant keys of said plurality of alpha-numeric data entry keys arranged to have absolute values of fourth quadrant abscissa and ordinate smaller than absolute values of the maximum negative abscissa value, and the maximum negative ordinate value;

(b) beginning user selection of keys at said space key or said reference key;

(c) allowing user selection of any one of said plurality of alpha-numeric data entry keys via an input device;

(d) returning to said space key or said reference key after user selection of any one of said plurality of alpha-numeric data entry keys; and (e) repeating (c) and (d) until an end of user selection.

13. The method of data entry of claim 12, wherein allowing user selection of any one of said plurality of alpha-numeric data entry keys includes navigating to any one of said plurality of alpha-numeric data entry keys via an input device includes utilizing a remote.

14. The method of data entry of claim 12, wherein the beginning user selection step includes highlighting said space key or said reference key.

15. The method of data entry of claim 12, wherein the beginning user selection step includes positioning a cursor on said space key or said reference key.

16. The method of claim 15, wherein the allowing user selection step includes the step of moving the cursor along a line parallel to one axis of the X-Y coordinate system according to the coordinate value of said one axis of said any one of said plurality of alpha-numeric data entry keys, then moving the cursor along a line parallel to the other axis according to the coordinate value of the other axis of said plurality of alpha-numeric data entry keys.

17. The method of data entry of claim 12, wherein said plurality of alpha-numeric data entry keys form an alphabet.

18. The method of data entry of claim 17, wherein said plurality of alpha-numeric data entry keys are arranged in alphabetical order.

19. The method of data entry of claim 12, wherein a distance from said space key or said reference key to any other key of said plurality of alpha-numeric data entry keys is defined as a square root of the sum of the squares of an abscissa value and an ordinate value for said any other key.

20. The method of claim 12, wherein all abscissa and ordinate values are integer values.

* * * * *